(12) United States Patent
Mital et al.

(10) Patent No.: US 8,910,168 B2
(45) Date of Patent: Dec. 9, 2014

(54) TASK BACKPRESSURE AND DELETION IN A MULTI-FLOW NETWORK PROCESSOR ARCHITECTURE

(71) Applicant: LSI Corporation, Milpitas, CA (US)

(72) Inventors: Deepak Mital, Orefield, PA (US); William Burroughs, Macungie, PA (US); Michael R. Betker, Orefield, PA (US)

(73) Assignee: LSI Corporation, San Jose, CA (US)

( * ) Notice: Subject to any disclaimer, the term of this patent is extended or adjusted under 35 U.S.C. 154(b) by 253 days.

(21) Appl. No.: 13/687,865

(22) Filed: Nov. 28, 2012

(65) Prior Publication Data

US 2013/0125127 A1    May 16, 2013

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/564,811, filed on Nov. 29, 2011.

(51) Int. Cl.
| | |
|---|---|
| *G06F 9/455* | (2006.01) |
| *G06F 9/46* | (2006.01) |
| *H04L 12/933* | (2013.01) |
| *H04L 12/931* | (2013.01) |
| *H04L 12/825* | (2013.01) |
| *H04L 12/835* | (2013.01) |
| *G06F 9/48* | (2006.01) |
| *G06F 12/08* | (2006.01) |

(52) U.S. Cl.
CPC ............... *G06F 9/46* (2013.01); *H04L 49/109* (2013.01); *H04L 49/506* (2013.01); *H04L 49/101* (2013.01); *H04L 47/263* (2013.01); *H04L 47/30* (2013.01); *G06F 9/4856* (2013.01); *G06F 12/084* (2013.01)
USPC .......................................................... 718/101

(58) Field of Classification Search
None
See application file for complete search history.

(56) References Cited

U.S. PATENT DOCUMENTS

| | | | |
|---|---|---|---|
| 4,123,795 | A | 10/1978 | Dean, Jr. et al. |
| 4,622,631 | A | 11/1986 | Frank et al. |

(Continued)

FOREIGN PATENT DOCUMENTS

JP    H02-271444    11/1990

OTHER PUBLICATIONS

Alan H. Karp and Rajiv Gupta, "Hardware Assist for Data Merging for Shared Memory Multiprocessors", Hewlett-Packard Labs, Palo Alto, CA, Mar. 13, 1994.

(Continued)

*Primary Examiner* — Corey S Faherty

(57) ABSTRACT

Described embodiments generate tasks corresponding to packets received by a network processor. A source processing module sends task messages including a task identifier and a task size to a destination processing module. The destination module receives the task message and determines a queue in which to store the task. Based on a used cache counter of the queue and a number of cache lines for the received task, the destination module determines whether the queue has reached a usage threshold. If the queue has reached the threshold, the destination module sends a backpressure message to the source module. Otherwise, if the queue has not reached the threshold, the destination module accepts the received task, stores data of the received task in the queue, increments the used cache counter for the queue corresponding to the number of cache lines for the received task, and processes the received task.

20 Claims, 6 Drawing Sheets

(56) References Cited

U.S. PATENT DOCUMENTS

| | | |
|---|---|---|
| 5,394,534 A | 2/1995 | Kulakowski et al. |
| 5,623,698 A | 4/1997 | Stephenson et al. |
| 5,838,931 A | 11/1998 | Regenold et al. |
| 5,892,766 A | 4/1999 | Wicki et al. |
| 5,893,120 A | 4/1999 | Nemes |
| 5,909,695 A | 6/1999 | Wong et al. |
| 5,943,283 A | 8/1999 | Wong et al. |
| 5,974,421 A | 10/1999 | Krishnaswamy et al. |
| 6,026,467 A | 2/2000 | Petty |
| 6,038,630 A | 3/2000 | Foster et al. |
| 6,052,697 A | 4/2000 | Bennett et al. |
| 6,115,802 A | 9/2000 | Tock et al. |
| 6,195,335 B1 | 2/2001 | Calvignac et al. |
| 6,216,167 B1 | 4/2001 | Momirov |
| 6,233,246 B1 | 5/2001 | Hareski et al. |
| 6,289,013 B1 | 9/2001 | Lakshman et al. |
| 6,341,130 B1 | 1/2002 | Lakshman et al. |
| 6,567,564 B1 | 5/2003 | van der Wal |
| 6,584,546 B2 | 6/2003 | Kavipurapu |
| 6,636,932 B1 | 10/2003 | Regev et al. |
| 6,658,012 B1 | 12/2003 | Baucom, Jr. et al. |
| 6,839,830 B2 | 1/2005 | Liu |
| 6,907,469 B1 | 6/2005 | Gallo et al. |
| 6,914,882 B2 | 7/2005 | Merani et al. |
| 7,058,057 B2 | 6/2006 | Dooley et al. |
| 7,085,911 B2 | 8/2006 | Sachedina et al. |
| 7,089,346 B2 | 8/2006 | Cebulla et al. |
| 7,159,219 B2 | 1/2007 | Chen et al. |
| 7,234,018 B1 | 6/2007 | Purcell et al. |
| 7,287,046 B2 | 10/2007 | Bulka et al. |
| 7,397,809 B2 | 7/2008 | Wang |
| 7,453,898 B1 | 11/2008 | Cohen et al. |
| 7,461,208 B1 | 12/2008 | Caprioli et al. |
| 7,461,407 B2 | 12/2008 | Little et al. |
| 7,512,740 B2 | 3/2009 | Diefendorff |
| 7,519,065 B2 | 4/2009 | Angle et al. |
| 7,554,464 B1 | 6/2009 | Oberdorfer |
| 7,594,028 B1 | 9/2009 | Jacobs et al. |
| 7,596,142 B1 | 9/2009 | MacAdam |
| 7,600,078 B1 | 10/2009 | Cen et al. |
| 7,659,894 B2 | 2/2010 | Keller et al. |
| 7,660,259 B1 | 2/2010 | Grosser et al. |
| 7,710,988 B1 | 5/2010 | Tripathi et al. |
| 7,720,055 B2 | 5/2010 | Kadambi et al. |
| 7,849,315 B2 | 12/2010 | Hardy et al. |
| 7,886,150 B2 | 2/2011 | Stollon et al. |
| 8,127,350 B2 | 2/2012 | Wei et al. |
| 8,140,759 B2 | 3/2012 | Frey et al. |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2003/0191857 A1* | 10/2003 | Terrell et al. ................... 709/244 |
| 2004/0255209 A1 | 12/2004 | Gross |
| 2005/0027920 A1 | 2/2005 | Fitzsimmons et al. |
| 2005/0141537 A1 | 6/2005 | Kumar et al. |
| 2005/0152352 A1 | 7/2005 | Jun et al. |
| 2006/0029079 A1 | 2/2006 | Cohen et al. |
| 2006/0256783 A1 | 11/2006 | Ayrapetian et al. |
| 2007/0011396 A1 | 1/2007 | Singh et al. |
| 2007/0016756 A1 | 1/2007 | Hsieh et al. |
| 2007/0043856 A1 | 2/2007 | Morris et al. |
| 2007/0226798 A1 | 9/2007 | Sibert |
| 2007/0271374 A1 | 11/2007 | Shomura et al. |
| 2008/0077928 A1 | 3/2008 | Matsuzaki et al. |
| 2008/0092092 A1 | 4/2008 | Dalton et al. |
| 2008/0162793 A1 | 7/2008 | Chu et al. |
| 2008/0239992 A1 | 10/2008 | Krasnyanskiy |
| 2008/0240103 A1 | 10/2008 | Schmidt |
| 2008/0240106 A1 | 10/2008 | Schlenk |
| 2009/0019270 A1 | 1/2009 | Halter et al. |
| 2009/0271562 A1 | 10/2009 | Sinclair |
| 2010/0260198 A1 | 10/2010 | Rojas-Cessa et al. |
| 2011/0219195 A1 | 9/2011 | Habusha et al. |
| 2012/0020368 A1* | 1/2012 | Sundararaman et al. ...... 370/412 |
| 2012/0020370 A1* | 1/2012 | Sonnier et al. ................ 370/412 |
| 2012/0023295 A1* | 1/2012 | Nemawarkar ................. 711/130 |
| 2012/0023498 A1* | 1/2012 | Sundararaman et al. ...... 718/102 |

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

Chiueh et al., "High-Performance IP Routing Table Lookup Using CPU Caching", IEEE (1999).

\* cited by examiner

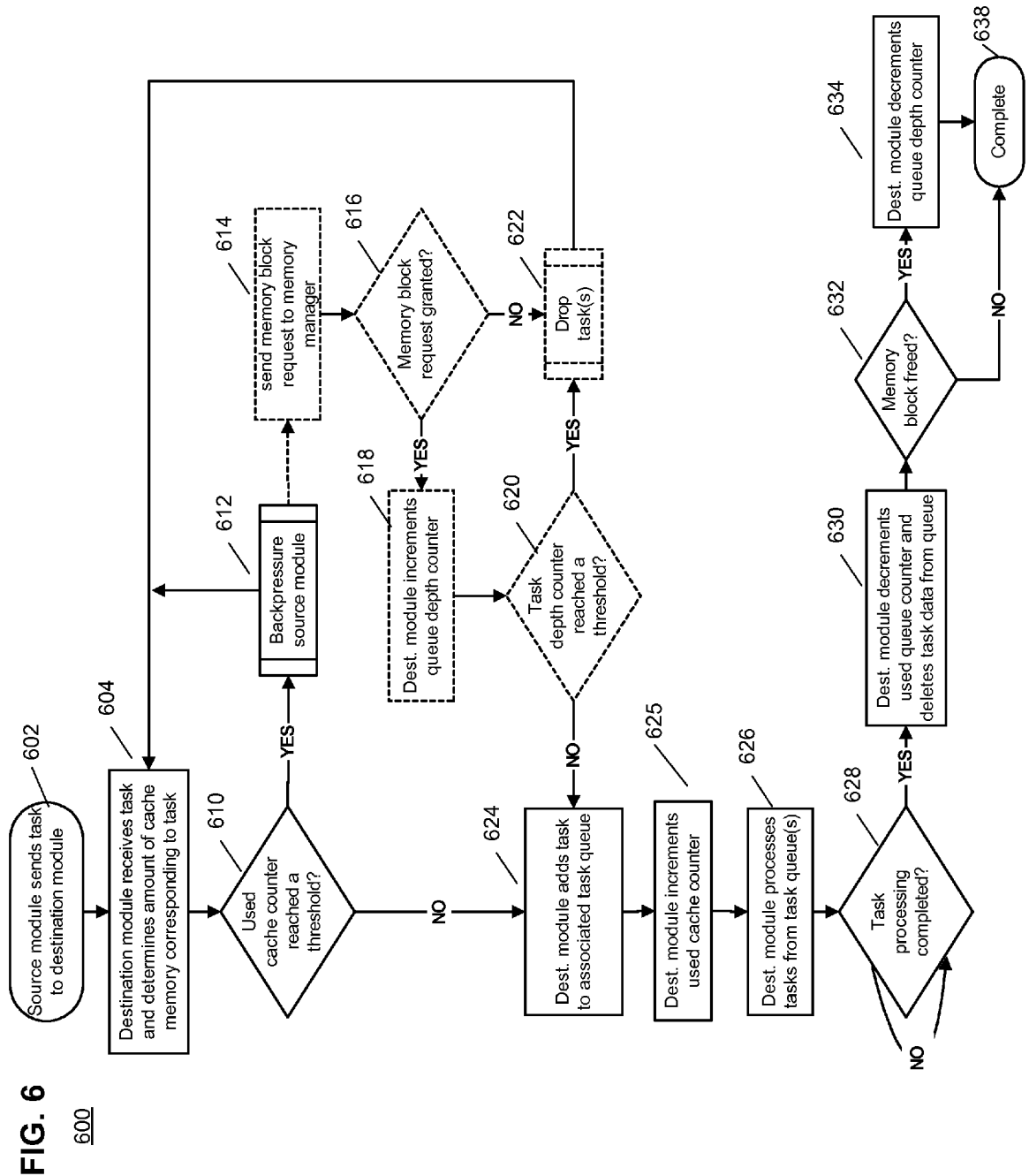

TASK BACKPRESSURE AND DELETION IN A MULTI-FLOW NETWORK PROCESSOR ARCHITECTURE

CROSS-REFERENCE TO RELATED APPLICATIONS

This application claims the benefit of the filing date of U.S. provisional application No. 61/564,811 filed Nov. 29, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, and Ser. No. 12/782,411 filed May 18, 2010, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,726 filed Mar. 12, 2011, Ser. No. 13/046,717 filed Mar. 12, 2011, Ser. No. 13/046,719 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719 filed on Nov. 28, 2012, Ser. No. 13/687,772 filed on Nov. 28, 2012, Ser. No. 13/687,911 filed on Nov. 28, 2012, Ser. No. 13/687,958 filed on Nov. 28, 2012, and Ser. No. 13/687,971 filed on Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments generate tasks corresponding to each packet received by a network processor. A source processing module sends a task message including a task identifier and a task size to a destination processing module. The destination module receives the task message and determines a task queue in which to store the task. Based on a used cache counter of the task queue and a number of cache lines required for the received task, the destination module determines whether the task queue has reached a usage threshold. If the task queue has reached the threshold, the destination module sends a backpressure message to the source module. Otherwise, if the task queue has not reached the threshold, the destination module accepts the received task, stores data of the received task in the task queue, increments the used cache counter for the task queue corresponding to the number of cache lines required for the received task, and processes the received task.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

FIG. 6 shows a block diagram of an exemplary process for backpressuring task sources and dropping tasks by a destination processing module of the network processor of FIG. 1.

DETAILED DESCRIPTION

Described embodiments generate tasks corresponding to each packet received by a network processor. A source processing module sends a task message including a task identifier and a task size to a destination processing module. The destination module receives the task message and determines a task queue in which to store the task. Based on a used cache counter of the task queue and a number of cache lines required for the received task, the destination module determines whether the task queue has reached a usage threshold. If the task queue has reached the threshold, the destination module sends a backpressure message to the source module. Otherwise, if the task queue has not reached the threshold, the destination module accepts the received task, stores data of the received task in the task queue, increments the used cache counter for the task queue corresponding to the number of cache lines required for the received task, and processes the received task.

Table 1 defines a list of acronyms employed throughout this specification as an aid to understanding the described embodiments of the present invention:

TABLE 1

| | |
|---|---|
| USB | Universal Serial Bus |
| SATA | Serial Advanced Technology Attachment |
| SCSI | Small Computer System Interface |
| SAS | Serial Attached SCSI |
| PCI-E | Peripheral Component Interconnect Express |
| SoC | System-on-Chip |
| AXI | Advanced eXtensible Interface |
| AMBA | Advanced Microcontroller Bus Architecture |
| PAB | Packet Assembly Block |
| MTM | Modular Traffic Manager |
| DBC | Data Buffer Controller |
| HE | Hash Engine |
| SENG | State Engine |
| TID | Task Identifier |
| OUL | Oldest Unspecified List |
| SCH | Scheduler |
| SPP | Security Protocol Processor |
| TIL | Task Input Logic |
| TCP | Transmission Control Protocol |
| IP | Internet Protocol |
| FIFO | First-In, First-Out |
| I/O | Input/Output |
| DDR | Double Data Rate |
| DRAM | Dynamic Random Access Memory |
| MMB | Memory Manager Block |
| μP | Microprocessor |
| PLB | Processor Local Bus |
| MPP | Modular Packet Processor |
| AAL5 | ATM Adaptation Layer 5 |
| SED | Stream Editor |
| TID | Thread Identifier |
| PQM | Pre-Queue Modifier |
| FBI | Function Bus Interface |
| CCL | Classification Completion List |
| OC | Ordered Call |
| SEM | Semaphore Engine |
| PCM | Per Context Memory |
| PDU | Protocol Data Unit |
| PIC | Packet Integrity Checker |
| CRC | Cyclic Redundancy Check |

Figure 1:
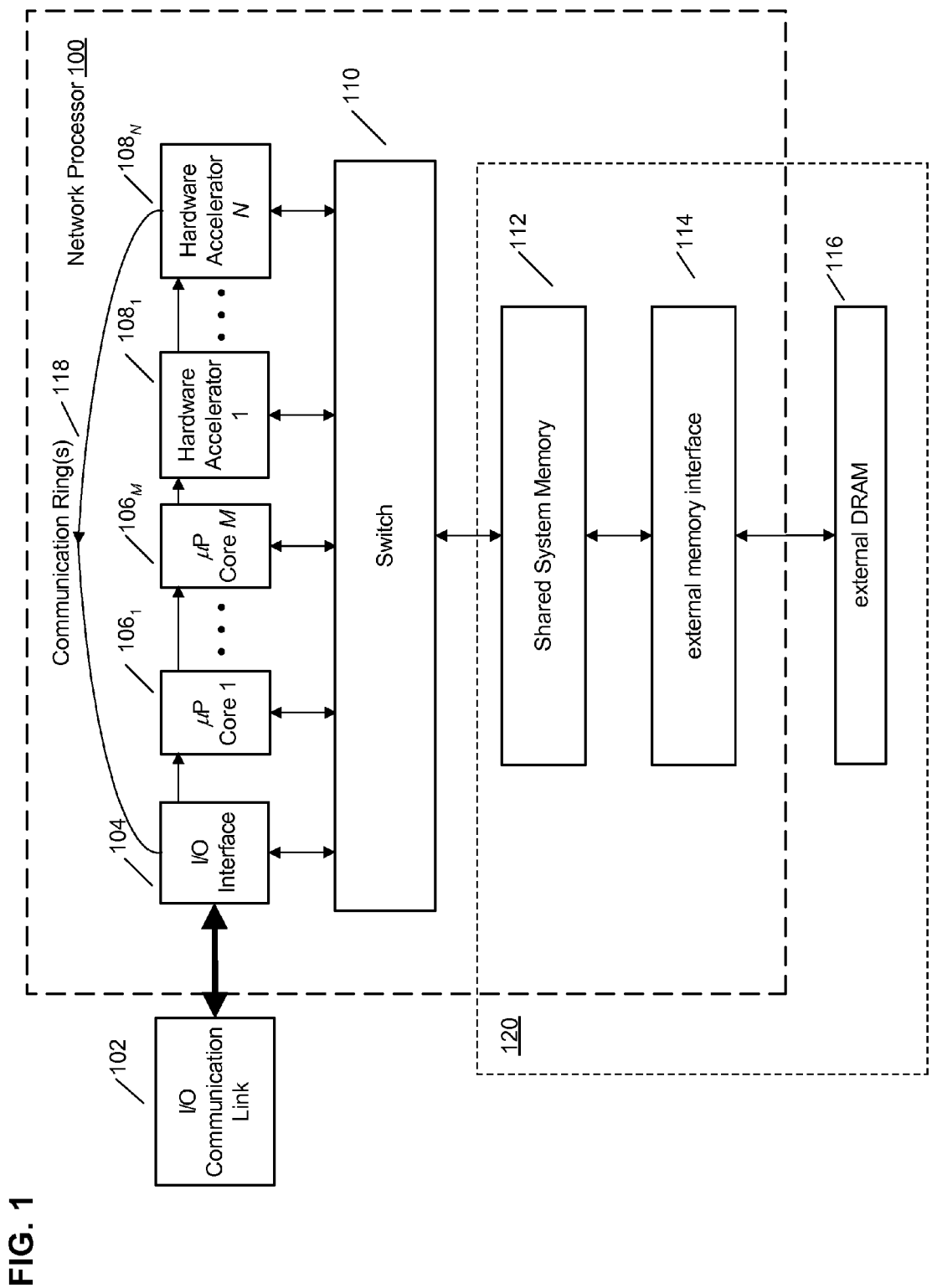
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hashtable additions, deletions, and collisions. Optionally associated with each hash entry is a timer that might be used under software control for tasks such as connection timeout and retransmission timing The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
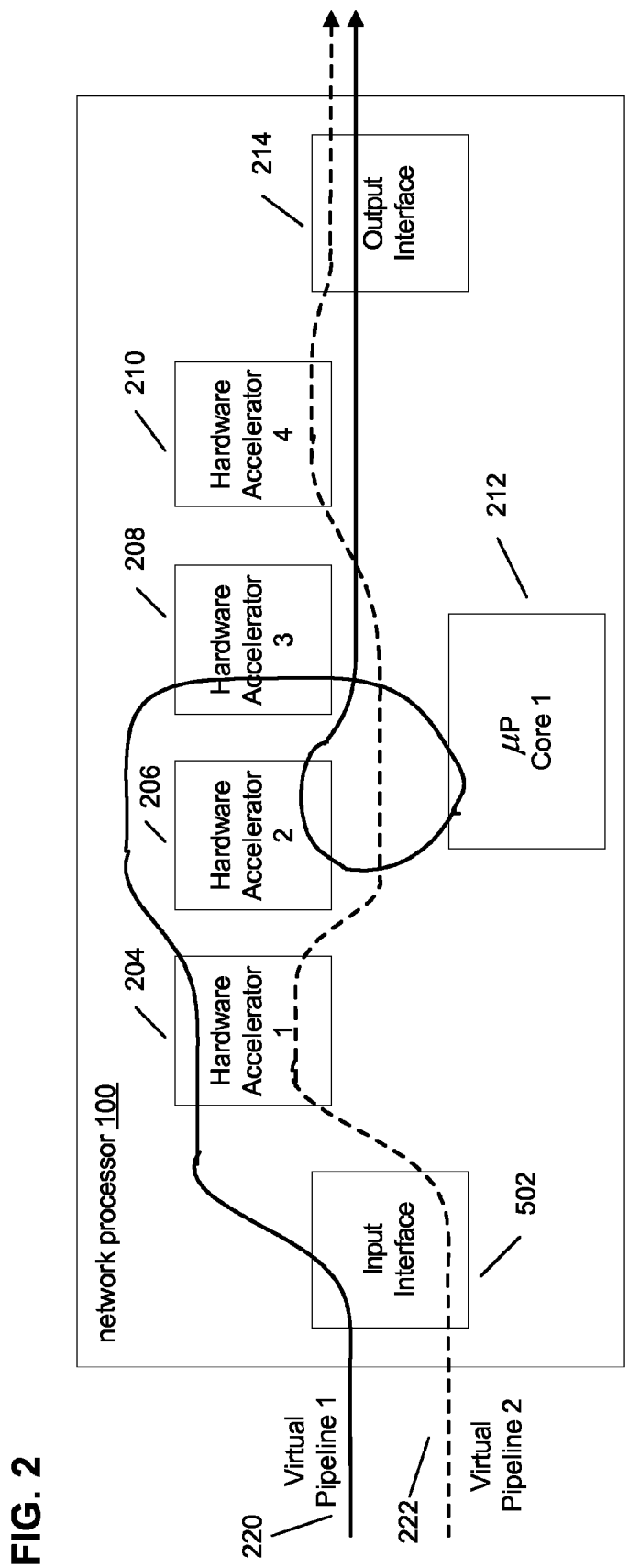
FIG. 2 shows an exemplary data flow of two virtual pipelines through the network processor of FIG. 1.

In exemplary embodiments, virtual pipelines might be defined that determine (1) a flow sequence of processing modules to be used for the task, (2) for each processing module, the required command and parameter fields, and (3) for each field, the source module of data output from a previous engine in the virtual pipeline or data that is constant for the pipeline. FIG. 2 shows a flow of two exemplary virtual pipelines through network processor 100. FIG. 2 shows a first virtual pipeline sequence 220 for processing an exemplary packet, and a second virtual pipeline 222 for processing another exemplary packet. As shown in FIG. 2, virtual pipeline 220 defines a processing order starting at input interface 202 (such as the I/O interface 104 of FIG. 1), hardware accelerator 204, hardware accelerator 208, µP core 212, hardware accelerator 206, and finally output interface 214. However, another packet received by the input interface 202 might be processed in accordance with second virtual pipeline 222. As shown in FIG. 2, virtual pipeline 222 also defines a processing order starting at input interface 202 and hardware accelerator 204 but then proceeds to hardware accelerator 210 and then output interface 214. Processor core 212 and hardware accelerator 206 and 208 are not included in virtual pipeline 222. Because only those hardware accelerators and µP cores that are required are included in a virtual pipeline, network processor 100 has increased efficiency of processing data packets.

As described herein, tasks are primary means of communication between hardware accelerators 108 of network processor 100. As described, a task is a request from a source processing module to a destination processing module for the destination module to perform some processing task. A task might contain packet data, commands, metadata, pointers, control and parameter data, and other information, such as a priority level and flow ID.

The destination processing module might typically store multiple variable-sized data blocks of tasks in an associated queue within shared system memory 112. In some embodiments, each processing module might have multiple task queues associated therewith. In some embodiments, the variable-sized data blocks might be 2 KB. Assigning a task to a particular queue might depends on any one or more of several factors, such as whether the tasks are ordered tasks or unordered tasks, the number of tasks in a given queue, and the size or depth of the queue. Ordered task queues might support parallel processing of tasks while keeping tasks for a given flow in order, while unordered tasks can be processed in any order.

Figure 3:
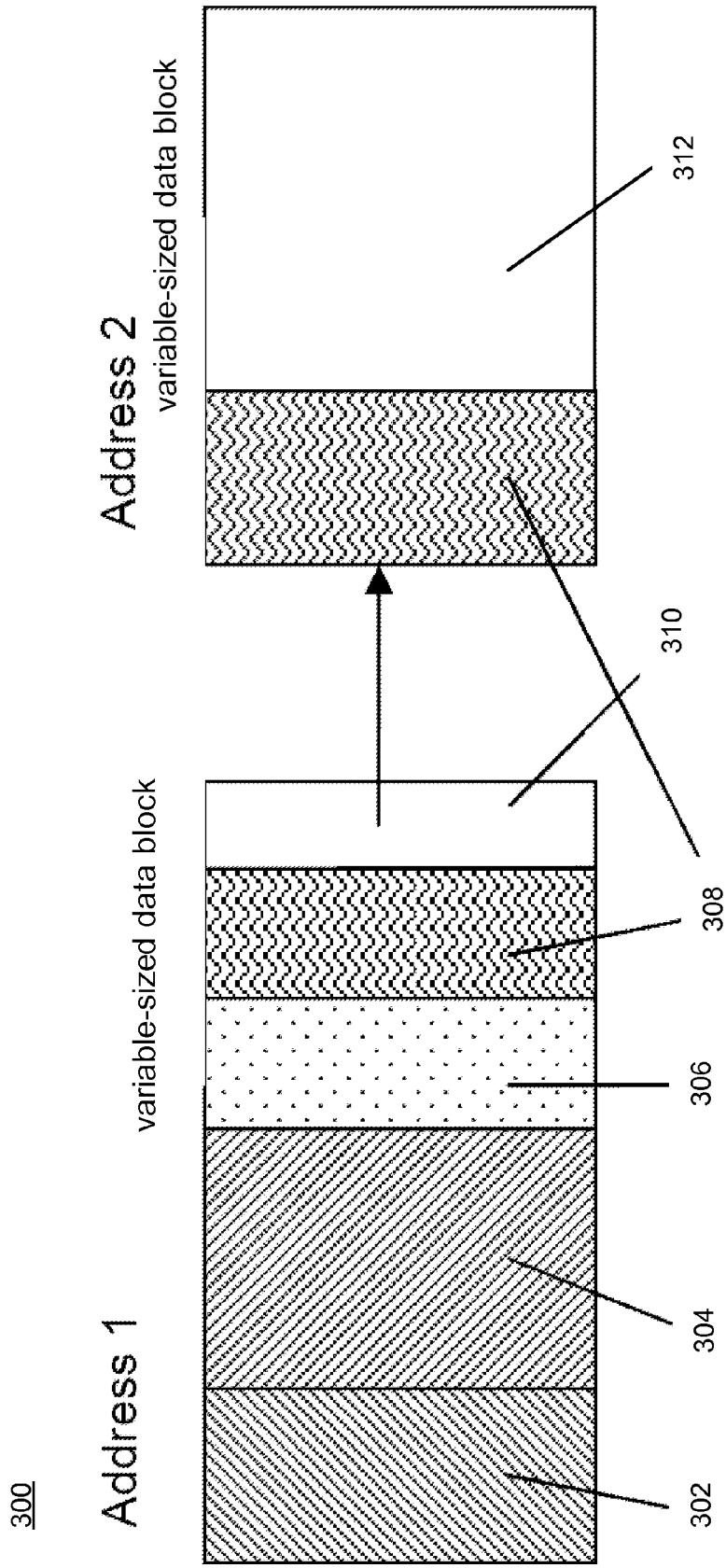
FIG. 3 shows a block diagram of an exemplary task queue structure of processing modules of the network processor of FIG. 1.

When the associated 2 KB block becomes full, the destination processing module sends two addresses in the response to the sourcing engine: (i) the address with the first 2 KB block to start writing the task, and (ii) the beginning address of a next 2 KB block in shared system memory 112. FIG. 3 shows a block diagram of an exemplary task queue structure of a destination core. As shown in FIG. 3, a first task 302 from a source processing module is stored in a queue in shared system memory 112, beginning at Address 1. Task 302 is followed by a second task 304 and a third task 306. Tasks 302-306 might be from any processing module (e.g., µP core 106 or hardware accelerators 108) of network processor 100. Task 306 is followed by a fourth task 308. However, task 308 exceeds a memory boundary of the first memory block of queue 300. In exemplary embodiments of the present invention, the memory boundary of each block is 2 KB. Thus, as a source processing module writes task 308 to the queue, the source processing module appends link 310, which provides a pointer to a next, linked, block of memory where the remainder of the fourth task is stored, starting at Address 2. Empty space 312 in the second block is available for additional tasks to be stored therein. Although shown in FIG. 3 as being at the end of the 2 KB block, link 310 might be placed anywhere within the 2 KB block.

To transfer a task to a destination engine, the source engine sends a request on the task ring. The destination engine responds with the address in the system memory where the task has to be written. Upon receiving the response, the source engine writes the task to the memory address, and sends an acknowledgment to the destination engine. The source processing module then writes the address of the next 2 KB block to a fixed location (e.g., the given offset, or the end of the block) within the first block to create a link between the 2 KB blocks. As described herein, the link does not necessarily have to be at the end of the 2 KB block, but can be anywhere within the block. In exemplary embodiments, if tasks are each 256 B long and each link is 16 B long, the link might be written anywhere after byte 240 in the 2 KB block. The source processing module writes partial task data to the first block and any remaining task data to the second block. The destination processing module reads all the tasks sequentially and when it reaches the end of the 2 KB block and there are more tasks to be read, it reads the link in the 2 KB block. When the link comes back from memory, the destination processing module continues to read the tasks. If the destination processing module is capable of consuming the tasks at a fast rate, the time to read the link might undesirably stall the destination processing module as it does not yet have an address from which to read the additional tasks.

Figure 4:
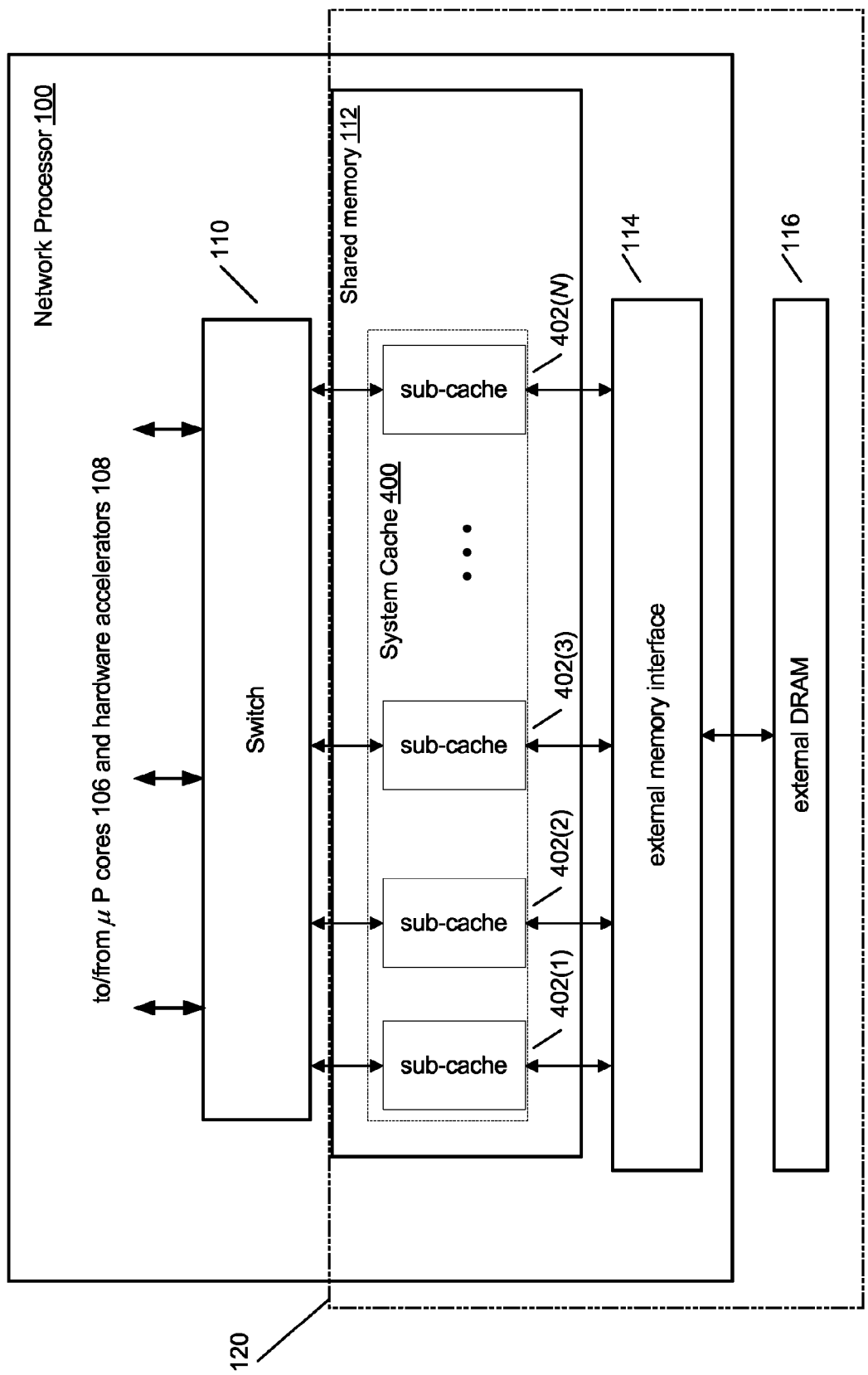
FIG. 4 shows a block diagram of an exemplary system cache of the network communications processor of FIG. 1.

FIG. 4 shows a block diagram of an exemplary embodiment of system cache 400 of network processor 100, in accordance with embodiments of the present invention. As shown in FIG. 4, system cache 400 might be implemented in shared memory 112. System cache 400 might include one or more sub-caches, shown as sub-caches 402(1)-402(N). Sub-caches 402(1)-402(N) might be employed to cache data from any µP core or accelerator (e.g., µP cores 106 or accelerators 108) of network processor 100. As indicated by the dashed line, shared memory 112 and external memory 116 are generally referred to as system memory 120.

As described in related U.S. patent applications Ser. Nos. 12/782,379, 12/782,393, and 12/782,411, which are incorporated by reference herein, sub-caches 402(1)-402(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 402(1)-402(N) might form a memory array, and the number of system caches might preferably be implemented as a power of two. One or more memory blocks might be allocated to each sub-cache 402(1)-402(N). In embodiments of the present invention, each sub-cache 402(1)-402(N) might be implemented as an N-way associative cache employing a least recently used (LRU) caching algorithm. In some embodiments, each sub-cache 402(1)-402(N) might have a total size of 512 kB and a cache line length of 256 B.

As described in related U.S. Patent Applications Ser. Nos. 13/192,104, 13/192,140 and 13/192,187, all filed on Jul. 27, 2011, and all of which are incorporated by reference herein, one or more processing modules of network processor 100 (e.g., µP cores 106 or accelerators 108) might have a corresponding local level one (L1) cache as part of an execution pipeline. In some embodiments, the various µP cores 106 might typically maintain cache coherency by communicating over a coherent communications bus, such as Processor Local Bus (PLB), which is a microprocessor bus architecture introduced by IBM, or Advanced eXtensible Interface (AXI), which is a higher frequency implementation of the Advanced Microcontroller Bus Architecture (AMBA) introduced by ARM Ltd. In some embodiments, local caches of the various hardware accelerators 108 might not communicate over a coherent bus, and thus atomic access operations related U.S. patent applications Ser. Nos. 13/192,104, 13/192,140 and 13/192,187, all filed on Jul. 27, 2011, might be employed to maintain coherency with system cache 200.

Thus, described embodiments of network processor 100 employ a system where multiple processing modules (e.g., µP cores 106 or accelerators 108) communicate via a central cache (e.g., system cache 400). Described embodiments avoid "cache thrashing" which might negatively affect performance of network processor 100. In a typical embodiment of network processor 100, as input packets are received by network processor 100, packet data might be written to system cache 400, and one or more tasks corresponding to the packet might be sent to a given processing module ("destination processing module") based on the virtual pipeline associated with the received packet. The destination processing module might typically process such tasks in the order in which they are received by the destination processing module. Each task thus causes a destination processing module to operate on data stored in system cache 400. As each task is processed, corresponding data in system cache 400 might become outdated and, as such, corresponding cache lines might be invalidated.

If the destination processing module slows down, a number of active cache lines might grow, eventually reaching a maximum and causing subsequent cache writes to evict older data from system cache 400, with the older data being written to external memory 116. When the destination module attempts to read data corresponding to an evicted cache line, the cache might return a miss since the data has been evicted. Thus, system cache 400 might need to read the evicted data from external memory 116, which might, in turn, cause another older entry of system cache 400 to be evicted to external memory 116. In such a situation, a given processing module might become stuck in a permanent "cache thrashing" situation where a new cache write causes data to be evicted to external memory 116 and a new cache read has to read evicted data from external memory 116. This might severely negatively affect performance of the destination processing module since the latency of external memory 116 might typically be much greater than the latency of system cache 400. Such cache thrashing might occur even if the destination processing module slows down only momentarily.

Figure 5:
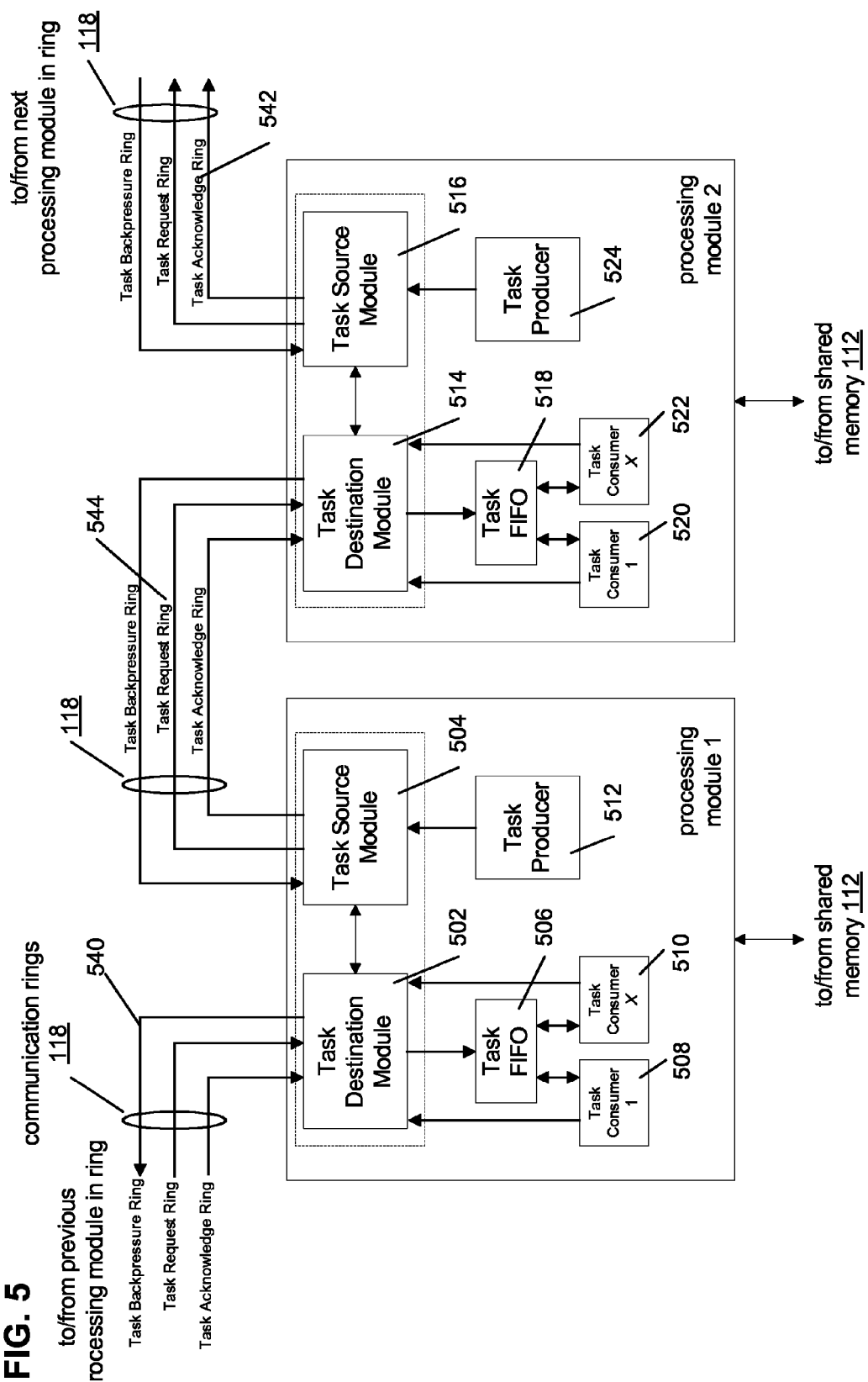
FIG. 5 shows a block diagram of exemplary processing modules and communication rings of the network processor of FIG. 1.

FIG. 5 shows a block diagram of exemplary task ring managers for each processing module of the network processor 100 of FIG. 1. As shown in FIG. 5, each processing module includes a task ring manager that includes two register stages: an input register stage (Task Destination Module 502) and an output register stage (Task Source Module 504) for commands on the task ring. The task destination modules 502 and 514 accept incoming tasks, maintain pointers for the task queues in the corresponding processing module, and pass received tasks to task consumers 508, 510, 520, 522 through task FIFOs 506 and 518. Task source modules 504 and 516 accept tasks from task producers 512 and 524, store the tasks in a temporary buffer (not shown) and send them out on task ring 130. Task Destination Module 502 stores the task command sent from a previous module on the ring and Task Source Module 504 stores the task command that needs to be sent to a next module on communication rings 118. As shown, communication rings 118 includes at least task backpressure ring 540, task request ring 544 and task acknowledge ring 542. Task Source Module 504 can insert a task command on the ring if the input register either has an empty slot or if the input register has a task command whose destination is this module.

If the input register has a task command that is not for this module, the module should copy this command on to its output register stage. There is an interface between the task destination module and the task source module that is used to pass an incoming task to the output of the task manager, for example to provide memory access for the task source module for task dropping, described below. Should too many requests be received for a destination processing module to process or the task queue depths for the destination processing module are reaching a maximum, a backpressure message is sent on task backpressure ring 540. When a processing module that is issuing tasks (a source processing module) receives a backpressure signal propagated along task backpressure ring 540, that source processing module stops issuing further task requests on task ring 544. In this example, each processing module has four holding buffer locations that are used to store requests and allow responses to flow during request backpressure. The holding buffers are used only when task flow control is active.

A source processing module, for example processing module 1 or a processing module prior to processing module 1 on communication rings 118, sends a task to a destination processing module, here processing module 2, by sending a task request signal or message on task request ring 544. Processing module 2 sends a response to processing module 1 on task acknowledge ring 542 that indicates an address to write the task, and processing module 1 appends the task data structure to input task FIFO queue 518 of processing module 2. Processing module 1 then sends an acknowledge signal that the write is complete on task acknowledge ring 542. Multiple processing modules might append tasks to the same input FIFO simultaneously to form a fully distributed system for the purpose of avoiding bottlenecks. In exemplary embodiments, the FIFO management structure supports one task enqueued per clock cycle in aggregate, which is a high enough rate where the task management mechanism is generally not considered to be a bottleneck.

It is possible that when network processor 100 is operating that one of the task queues of the destination processing module becomes very large such that the destination processing module either (i) communicates to the source processing module(s) to stop sending tasks (backpressure), or (ii) drops tasks at the tail end of the queue to prevent the queue from becoming too large. In exemplary embodiments of network processor 100, all processing modules (e.g., µP cores 106 and hardware accelerators 108) might implement task dropping, while only a subset of the processing modules might implement backpressure.

As described herein, a task source processing module sends a task to a task destination processing module. If the task destination processing module has reached a queue size threshold, the task destination processing module might become a "backpressure source" to send a backpressure message to the task source module (now also a "backpressure destination").

When a task queue within a processing module backs up, the processing module sends a backpressure message. When the task queue depth becomes greater than a threshold, a backpressure "on" message might be generated on backpressure ring 540. When the cache depth goes below the threshold, a backpressure "off" message might be generated on backpressure ring 540. Hysteresis might be built into backpressure message generation and release such that a backpressure on message is not generated until the queue depth is more than the threshold by some amount and a backpressure off message is not generated until the queue depth falls below a certain amount below the threshold. Each backpressure message might be associated with a backpressure ID.

In some embodiments, tasks might be dropped when a task destination does not have space available in the queue (e.g., there are not available 2 KB blocks to store tasks) and the MMB denies a request for additional 2 KB blocks. In some embodiments highest priority tasks might not be dropped. When a task is dropped, the destination processing module might send a drop message corresponding to the dropped task(s) to the source processing module. Destination processing modules might implement multiple thresholds to determine whether to backpressure or drop tasks. In some embodiments, for each task queue, the destination processing module might implement a first drop threshold based on the task queue usage, and a second drop threshold based on a global usage of 2 KB memory blocks. If either of the drop thresholds are reached or exceeded, a new incoming task might be dropped. For the task queue usage calculation, each task queue might have at least a minimum threshold, a maximum threshold and a drop probability profile. Determining whether to drop an incoming task might be based on a total size of PDU data in the task queue, or based on a total number of tasks in the task queue. If the number of tasks or the size of the PDU data in the task queue is below the minimum threshold, the new task is accepted. If the number of tasks or the size of the PDU data in the task queue is above the maximum threshold, the new task is dropped. If the number of tasks or the size of the PDU data in the task queue is between the minimum threshold and the maximum threshold, the drop probability of the new task might vary based on the drop probability profile where low priority tasks are dropped before high priority tasks are dropped.

For the global buffer based calculation, there might typically be a minimum threshold, a maximum threshold and a drop probability profile for each priority task. The calculations are done based on the number of 2K byte blocks available for allocation to task queues. Tasks sent to a queue might be dropped based on the queue's occupancy and a number of 2 KB blocks available for allocation.

In some embodiments, PDU data might be provided to a destination processing module as at least one of (i) inline data in a corresponding task and (ii) as pointers in the task corresponding to locations in shared memory 112 containing the PDU data. The task data, including inline PDU data and PDU pointers, might be stored in the task queue of the destination processing module. Other task control data might also be stored in the task queue of the destination processing module.

When the task request is generated by the source processing module, the source processing module might also include in the task request an amount of memory (e.g., a number of cache lines used) used by the associated PDU data (e.g., PDU pointers and inline PDU data). If the destination processing module accepts the task request, the destination processing module adds the cache line used to its input queue depth in order to store the associated PDU data.

As described herein, a destination processing module might request additional 2 KB blocks from the MMB to store more data in a task queue. Further, a destination processing module might maintain one or more queue depth counters for each of its corresponding input queues. As the destination processing module requests additional 2 KB blocks to hold the tasks, the destination processing module adds 8 cache lines (e.g., if each cache line is 256 B) to the input queue depth and, thus, increments a corresponding queue depth counter by 8. When associated cache lines are used by PDU data (e.g., PDU pointers and inline PDU data), a used queue depth counter might be incremented by the number of used cache lines. When a 2 KB block is freed as tasks are read from the memory block, the queue depth counter is decremented by 8. When the task is deleted from the destination processing module (e.g., the task is completed and sent to a next destination processing module), the used queue depth counter might be decremented by the number of associated cache lines that were used by the PDU data (e.g., PDU pointers and inline PDU data). Thus, in described embodiments, a destination processing module tracks the available queue depth of its input queues (e.g., tracks the number of cache lines used by queued task data) to determine whether to discard tasks or send backpressure messages.

FIG. 6 shows a flow diagram of task backpressure and drop determining process 600 of various destination processing modules of network processor 100. At step 602, a source processing module sends a task to a destination processing module. At step 604, the destination processing module receives the task and determines the amount of cache memory (e.g., cache lines) required to store the PDU data corresponding to the task. At step 610, destination processing module determines whether the used cache counter has reached a threshold. If the used cache counter has reached a threshold, at step 612 the destination processing module sends a backpressure message to the source module. Process 600 might return to step 604 to receive subsequent tasks. In some embodiments, after step 612, the destination processing module might optionally request an additional 2 KB memory block from the MMB at step 614. At step 616, if the MMB grants the request for a new block (e.g., by providing an address of a new block), then at step 618, the destination processing module increments the queue depth counter by a number of cache lines in a memory block (e.g., by 8 if each cache line is 256 B and each memory block is 2 KB). At step 620, if the task depth counter has reached a threshold, then one or more tasks might be dropped at step 622. At step 616, if the MMB does not grant the request for a new block (e.g., no additional blocks are available), then at step 622, the destination processing module drops one or more tasks. After tasks are dropped at step 622, process 600 returns to step 604 to receive subsequent tasks. If, at step 620, the task depth counter has not reached a threshold, then process 600 proceeds to step 624. As shown in FIG. 6, steps 614, 616, 618, 620 and 622 might be performed optionally in some embodiments (as indicated by the dashed lines).

As described herein, at step 622, destination processing module might determine whether to drop an incoming task might be based on a total size of PDU data in system memory 120, or based on a total number of tasks in system memory 120. If the number of tasks or the size of the PDU data in system memory 120 is below the minimum threshold, the new task is accepted. If the number of tasks or the size of the PDU data in system memory 120 is above the maximum threshold, the new task is dropped. If the number of tasks or the size of the PDU data in system memory 120 is between the minimum threshold and the maximum threshold, the drop probability of the new task might vary based on the drop probability profile where low priority tasks are dropped before high priority tasks are dropped.

At step 624, the destination processing module adds the received task to an associated queue of the destination processing module (e.g., based on task type, task priority, etc.). At step 625, the destination processing module increments the used cache counter corresponding to the number of cache lines needed to store the received and accepted task. At step 626, the destination processing module processes the tasks from the various queue(s). At step 628, as tasks complete processing, then at step 630, the destination processing module decrements the used queue counter and can delete, remove or otherwise invalidate the task data in the queue. At step 632, if removing the task data from the queue does not result in an entirely unused memory block, then at step 638, process 600 completes. At step 632, if removing the task data from the queue allows a memory block to become entirely unused, then at step 634 the destination module might release the memory block to the MMB and decrement the queue depth counter by the number of cache lines in the released memory block. At step 638, process 600 completes.

Thus, described embodiments generate tasks corresponding to each packet received by a network processor. A source processing module sends a task message including a task identifier and a task size to a destination processing module. The destination module receives the task message and determines a task queue in which to store the task. Based on a used cache counter of the task queue and a number of cache lines required for the received task, the destination module determines whether the task queue has reached a usage threshold. If the task queue has reached the threshold, the destination module sends a backpressure message to the source module. Otherwise, if the task queue has not reached the threshold, the destination module accepts the received task, stores data of the received task in the task queue, increments the used cache counter for the task queue corresponding to the number of cache lines required for the received task, and processes the received task.

Thus, as described herein, described embodiments provide a packet classifier for a network processor that generates tasks corresponding to each received packet. The packet classifier includes a scheduler to generate contexts corresponding to tasks received by the packet classifier from a plurality of processing modules of the network processor. The packet classifier processes threads of instructions, each thread of instructions corresponding to a context received from the scheduler, and each thread associated with a data flow. A thread status table has N entries to track up to N active threads. Each status entry includes a valid status indicator, a sequence value, a thread indicator and a flow indicator. A sequence counter generates a sequence value for each data flow of each thread and is incremented when processing of a thread is started, and is decremented when a thread is completed. Instructions are processed in the order in which the threads were started for each data flow.

While the exemplary embodiments have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A method of processing a received packet of a network processor, wherein the network processor comprises a plurality of processing modules and at least one shared memory, the method comprising:
    generating one or more tasks corresponding to each received packet;
    sending, by a source processing module, a task message corresponding to a task to a destination processing module, the task message comprising a task identifier and a task size;
    receiving, by the destination processing module, the task message;
    determining, by the destination processing module, (i) an associated one of a plurality of task queues of the destination processing module in which to store the task, and (ii) based on (1) a used cache counter of the destination processing module associated with the associated task queue and (2) a number of cache lines required for the received task, whether the associated task queue has reached a usage threshold;
    if the associated task queue has reached the usage threshold:
        sending a backpressure message to the source processing module;
    otherwise, if the associated task queue has not reached the usage threshold:
        accepting the received task and storing data associated with the received task in the associated task queue;
        incrementing the used cache counter for the associated task queue corresponding to the number of cache lines required for the received task; and
        processing, by the destination processing module, the received task.

2. The method of claim 1, further comprising:
    when the step of processing the received task completes, decrementing the used cache counter for the associated task queue corresponding to the number of cache lines for the completed task.

3. The method of claim 1, wherein each queue comprises one or more memory blocks in the at least one shared memory, the method further comprising:
    determining, by the destination processing module whether the received task is larger than space available within a current memory block of the associated queue;
    if the task is larger than space available within a current memory block of the associated queue:
        determining an address of a next memory block in the at least one shared memory for the associated queue, and providing the address of the next memory block to the source processing module;
    providing an offset address within the current memory block of the associated queue to the source processing module;
    writing, by the source processing module, the task to the at least one shared memory based on at least one of the provided offset address and the address of the next memory block, if provided;
    if a task is written to more than one memory block of the associated queue:
        preloading, by the destination processing module, the address of the next memory block to a local memory of the destination processing module; and
        processing, by the destination processing module, queued tasks without stalling to retrieve the address of the next memory block from the at least one shared memory.

4. The method of claim 3, further comprising:
    writing, by the source processing module, the address of the next memory block as a link address in a previous memory block of the associated queue.

5. The method of claim 4, further comprising:
    writing, by the source processing module, the link address at the end of the previous memory block.

6. The method of claim 4, wherein, for the method, each memory block is 2 KB, each task is 256 B and each link address is 16 B.

7. The method of claim 6, further comprising:
    writing the link address after byte 240 in the 2 KB memory block.

8. The method of claim 3, further comprising:
    allocating, by a memory manager of the network processor, one or more additional memory blocks to a queue to store additional new tasks.

9. The method of claim 1, further comprising:
    sending tasks and task requests between processing modules over one or more unidirectional ring buses, each ring bus coupled between two adjacent processing modules.

10. The method of claim 9, further comprising:
    determining, by each processing module, if the processing module is an associated destination processing module for a received task message and, if so: the processing module processes the task message;
    otherwise, the processing module passes the task message unchanged to an adjacent one of the ring-coupled processing cores.

11. The method of claim 10, wherein each task comprises at least one of: (i) pointers to data stored in the at least one memory, (ii) inline data corresponding to the task message, (iii) control data corresponding to the task message, and (iv) a flow identifier corresponding to the task.

12. The method of claim 11, further comprising:
    determining, based on the flow identifier, a processing order for each task through one or more of the plurality of processing modules of the network processor.

13. The method of claim 12, wherein the processing modules comprise at least one of a programmable processor and a dedicated hardware accelerator.

14. A non-transitory machine-readable medium, having encoded thereon program code, wherein, when the program code is executed by a machine, the machine implements a method of processing a received packet of a network processor, wherein the network processor comprises a plurality of processing modules and at least one shared memory, the method comprising:
    generating one or more tasks corresponding to each received packet;
    sending, by a source processing module, a task message corresponding to a task to a destination processing module, the task message comprising a task identifier and a task size;
    receiving, by the destination processing module, the task message;
    determining, by the destination processing module, (i) an associated one of a plurality of task queues of the destination processing module in which to store the task, and (ii) based on (1) a used cache counter of the destination processing module associated with the associated task queue and (2) a number of cache lines required for the received task, whether the associated task queue has reached a usage threshold;

if the associated task queue has reached the usage threshold:
  sending a backpressure message to the source processing module;
otherwise, if the associated task queue has not reached the usage threshold:
  accepting the received task and storing data associated with the received task in the associated task queue;
  incrementing the used cache counter for the associated task queue corresponding to the number of cache lines required for the received task; and
  processing, by the destination processing module, the received task.

15. The non-transitory machine-readable medium of claim 14, wherein each queue comprises one or more memory blocks in the at least one shared memory, the method further comprising:
  determining, by the destination processing module whether the received task is larger than space available within a current memory block of the associated queue;
  if the task is larger than space available within a current memory block of the associated queue:
    determining an address of a next memory block in the at least one shared memory for the associated queue, and providing the address of the next memory block to the source processing module;
  providing an offset address within the current memory block of the associated queue to the source processing module;
  writing, by the source processing module, the task to the at least one shared memory based on at least one of the provided offset address and the address of the next memory block, if provided;
  if a task is written to more than one memory block of the associated queue:
    preloading, by the destination processing module, the address of the next memory block to a local memory of the destination processing module; and
  processing, by the destination processing module, queued tasks without stalling to retrieve the address of the next memory block from the at least one shared memory.

16. A network processor comprising:
  a plurality of processing modules and at least one shared memory, one or more of the processing modules configured to generate one or more tasks corresponding to each of a plurality of packets received by the network processor;
  a source processing module configured to send a task message corresponding to a task to a destination processing module, the task message comprising a task identifier and a task size;
  the destination processing module configured to (i) receive the task message and (ii) determine: (a) an associated one of a plurality of task queues of the destination processing module in which to store the task, and (b) based on (1) a used cache counter of the destination processing module associated with the associated task queue and (2) a number of cache lines required for the received task, whether the associated task queue has reached a usage threshold;
  if the associated task queue has reached the usage threshold:
    the destination processing module is configured to send a backpressure message to the source processing module;
  otherwise, if the associated task queue has not reached the usage threshold:
    the destination processing module is configured to: (i) accept the received task, (ii) store data associated with the received task in the associated task queue, (iii) increment the used cache counter for the associated task queue corresponding to the number of cache lines required for the received task, and (iv) process the received task.

17. The network processor of claim 16, wherein:
  each queue comprises one or more memory blocks in the at least one shared memory;
  the destination processing module is further configured to:
    determine whether the received task is larger than space available within a current memory block of the associated queue;
    if the task is larger than space available within a current memory block of the associated queue:
      determine an address of a next memory block in the at least one shared memory for the associated queue, and provide the address of the next memory block to the source processing module;
    provide an offset address within the current memory block of the associated queue to the source processing module, wherein the source processing module is configured to write the task to the at least one shared memory based on at least one of the provided offset address and the address of the next memory block, if provided;
  if a task is written to more than one memory block of the associated queue, the destination processing module is configured to:
    preload the address of the next memory block to a local memory of the destination processing module; and
    process queued tasks without stalling to retrieve the address of the next memory block from the at least one shared memory.

18. The network processor of claim 16, wherein each processing module is configured to:
  send tasks and task requests between processing modules over one or more unidirectional ring buses, each ring bus coupled between two adjacent processing modules, wherein each task comprises at least one of: (i) pointers to data stored in the at least one memory, (ii) inline data corresponding to the task message, (iii) control data corresponding to the task message, and (iv) a flow identifier corresponding to the task;
  determine, based on the flow identifier, a processing order for each task through one or more of the plurality of processing modules of the network processor;
  determine if the processing module is an associated destination processing module for a received task message and, if so, process the task message;
  otherwise, pass the task message unchanged to an adjacent one of the ring-coupled processing cores.

19. The network processor of claim 16, wherein the processing modules comprise at least one of a programmable processor and a dedicated hardware accelerator.

20. The network processor of claim 16, wherein the network processor is implemented in an integrated circuit chip.

* * * * *